May 12, 1936.   H. J. BUTCHER   2,040,356
FLUID VALVE
Filed Sept. 11, 1934   2 Sheets-Sheet 1
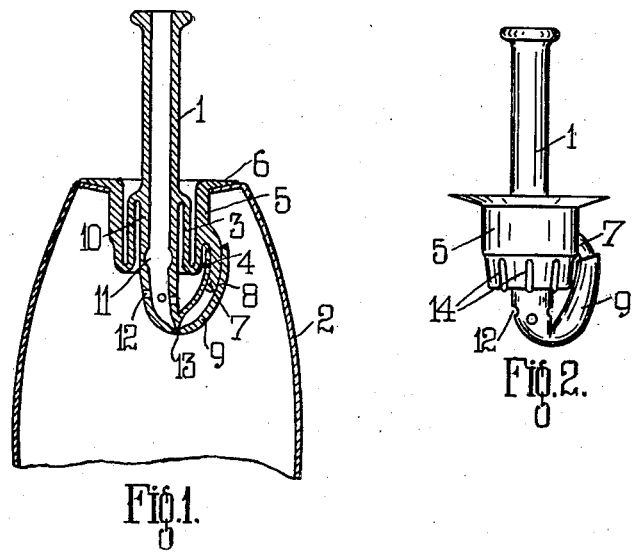
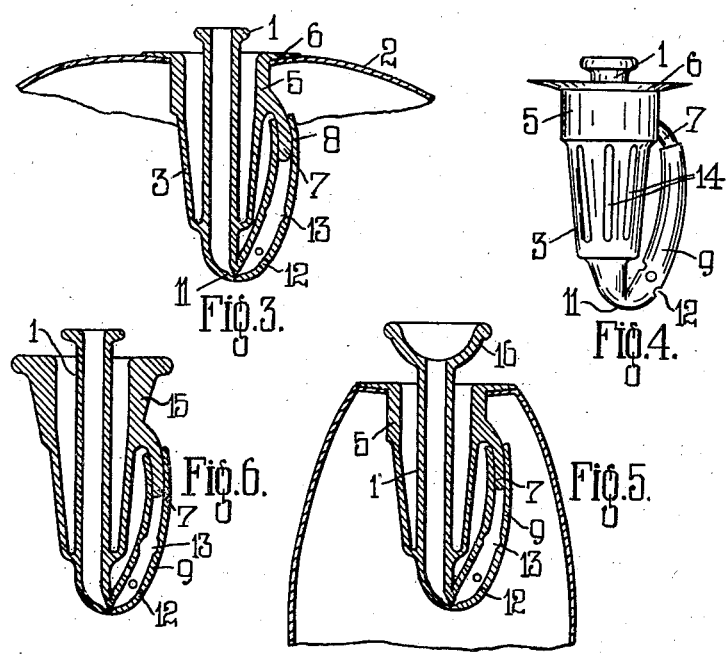

May 12, 1936.　　　H. J. BUTCHER　　　2,040,356
FLUID VALVE
Filed Sept. 11, 1934　　　2 Sheets-Sheet 2
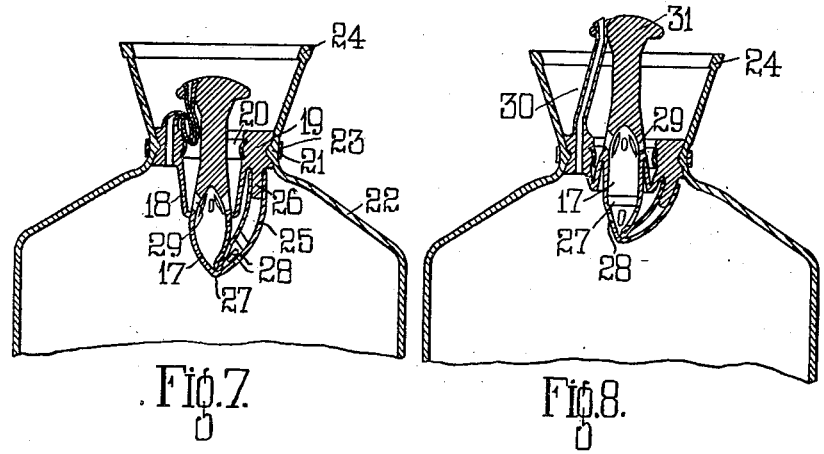
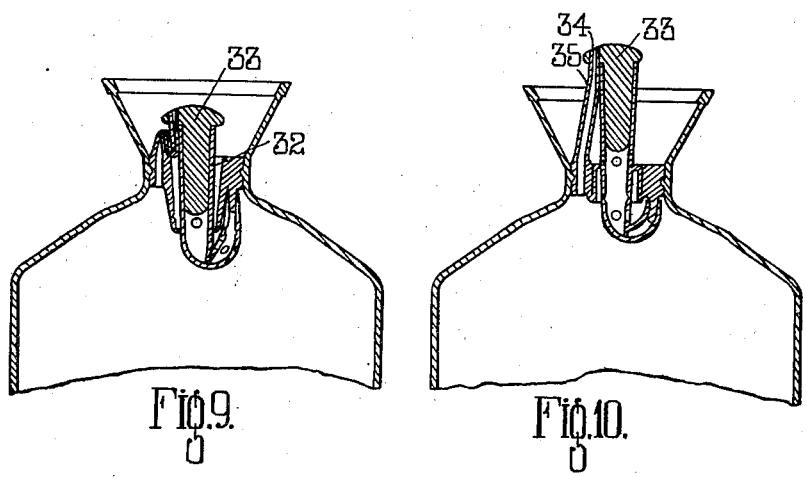
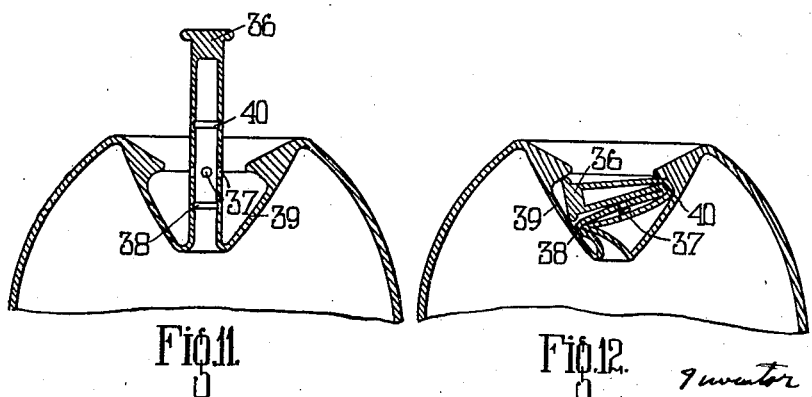

Patented May 12, 1936

2,040,356

UNITED STATES PATENT OFFICE 2,040,356

FLUID VALVE

Henry James Butcher, Leyland, near Preston, England, assignor to The Leyland and Birmingham Rubber Company, Limited, Leyland, near Preston, England, a British company Application September 11, 1934, Serial No. 743,605
In Great Britain January 4, 1934

6 Claims. (Cl. 152—12)

The present invention relates to an improved fluid valve for containers such as bladders of rubber or the like material, pneumatic tyres, playing balls, gas balloons, air cushions, water bottles, gas masks, life belts or containers of glass, metal or the like of the type in which a rubber tube can be folded on itself to prevent escape of fluid through it.

According to the present invention, the valve comprises a rubber tube mounted on a casing and having a variation in cross-section at a point between the inlet opening or openings to the tube and the outlet from the tube to the interior of the casing, which variation in cross-section automatically predetermines the point of folding of the tube on itself, to pneumatically seal the tube.

The invention is more particularly described with reference to the accompanying drawings in which:—

Figure 1 shows one form of device as fitted to a rubber cushion or bladder, with the valve in the position for inflating or deflating.

Figure 2 is an external view of the valve alone in an open position.

Figure 3 is a sectional view corresponding to Fig. 1 with the valve in the closed position.

Figure 4 is an external view of the valve alone in the closed position.

Figure 5 is a sectional view of a valve suitable for a life belt or water bottle.

Figure 6 is a similar view of a valve suitable for attachment in the orifice of a container.

Figure 7 is a sectional elevation of a modified form of the improved valve as applied to a hot-water bottle.

Figure 8 is a similar view of the parts in a different position.

Figure 9 shows a further modified form of valve with the parts in the closed position.

Figure 10 shows a similar view with the parts in the open position.

Figures 11 and 12 are sectional views in open and closed position of a further modification.

The valve comprises a stem or tube 1, of rubber, but it may be of rigid material flexibly connected to the body 2 of a ball, cushion, or the like by means of a sleeve 3 of rubber. In the arrangement shown, the valve forms a separate unit to the bladder or ball 2 to be vulcanized thereto, and in this case, the sleeve 3 is connected by a fold 4 to an outer sleeve 5 having a flange 6 for vulcanizing to the bladder or cushion 2. This outer sleeve 5 has a lug or spigot 7 upon it, to which the outer end 8 of an extension tube 9 of rubber is secured, the opposite end 10 of which tube is integral with, or connected to the tube 1.

The extension tube 9 preferably has a change in cross-section at a point 11 formed preferably by grooving the tube 9 at this place. Alternatively, this change in cross-section may be formed by strengthening the tube at two adjacent points. By the former means a recessed seating is provided on one-half-wall of the tube for the folded part of the other half-wall.

Holes 12 are provided between the points of change in cross-section as at 11 and 13 and the connection point 7, so that after inflation of the ball, cushion or the like with the parts in the position shown in Figures 1 and 2, the stem 1 can be pushed into the position shown in Figures 3 and 4, in which the tube 9 folds upon itself to provide a pressure tight seal or valve at the fold 11.

If desired, the extension tube 9 may also have a change in cross-section, such as for instance, by weakening the tube as at 13, between the openings 12 and the connection with the part 7, so that a second hinge line is formed, when the parts are in the position shown in Figures 1 and 2 suitable for inflation or deflation of the ball, or cushion.

Strengthening ribs 14 can be provided on the outside or the inside of the sleeve 3.

It will be seen that by this means a very simple valve is obtained by means of which a ball can be inflated or a container filled by pulling out the tube 1 and then maintained inflated or filled by simply pushing in the tube 1 into the position shown in Figure 3, the valve maintaining a firm seal which is the tighter, the higher the internal pressure and not essentially involving any projection from the article when the valve is closed.

If desired the tube or stem 1 may be flared to provide a mouth piece for inflation, or to assist in the pouring in of liquid, as indicated at 16 (Figure 5).

Instead of making the valve body or casing part of a container it may be formed integral with a conical plug as at 15 (Figure 6) so that it can be inserted in the orifice of a bottle, jar or other container.

In the construction of Figure 7, the valve consists of a tube 17, of rubber mounted by means of a diaphragm 18, upon a ring 19, which, in certain cases, can of course be integral with the casing. In the case shown, the ring 19 has grooves in it, viz, an internal groove to receive a rigid ring 20 of rubber and an external groove to receive a beading 21 on the neck of the hot water bottle 22, this beading 21 being securely clamped within the groove in the ring 19 by means of a metal ring 23 slipped over the open end 24 of the hot water bottle by tensioning this.

The tube 17 has an extension piece 25 connected to a pipe 26 on the ring 19, and is weakened to form a fold line as at 27, openings 28 being provided between this fold-line and the connection 26 to the ring 19.

Additional openings 29 are provided on the opposite side of the diaphragm to that on which the valve 17 is disposed, so that when the parts are in the position of Figure 8, liquid filled in the open end of the neck 24 enters when the openings 29 pass down the stem of the valve 17, and out into the bottle through the openings 28.

To facilitate filling, an air tube 30 may be provided, which, when the valve is closed by pushing in the stem 31, bends or folds upon itself to seal this.

In the modified arrangement shown in Figures 9 and 10, the stem for withdrawing the valve or pushing it into the closed position is formed as a rubber tube 32, sealed by a plug 33, which receives the open end 34 of the air tube 35.

In a further modified form of construction shown in Figures 11 and 12, the valve is disposed outside the container and consists of a stem 36 having openings 37, and fold-line 38 between the holes 37, and the connection of the valve to the body of the container 39. As shown in Fig. 11, liquid may be filled into the container through the holes 37, whereupon the valve can be folded down upon itself upon the hinge line 38 to seal the valve. If desired, a second fold-line 40 may be provided.

I declare that what I claim is:—

1. A fluid valve for containers comprising in combination a flange, a flexible rubber tube having its outer wall flexibly connected to said flange for permitting relative movement thereof, said tube having outlet holes and having a variation in its cross section between the open end of said tube and said holes, said variation in cross-section causing the tube to be folded thereat to hermetically seal the tube.

2. A fluid valve for containers comprising a flange, a rubber tube having an open end and openings intermediate its length and a variation in cross section between said openings and the open end, and a second variation in cross section between the openings and the inner end of the tube, means to secure rigidly the inner end of the tube to the container, and a flexible diaphragm connecting the outer wall of the tube and said flange at a point between the open end and said openings and also between the open end and the first variation, the first variation in cross-section cooperating with the inner end of the tube to collapse the tube and effect the sealing thereof, said second variation serving to maintain communication with the interior of the container when the tube is in open position.

3. A fluid valve for containers comprising in combination, a tube sealed to the container and providing a passage therethrough for the movement of fluid, said tube having a flexible portion for permitting a folding of the tube and for permitting movement thereof relative to the container, said tube having the inner end thereof connected to the container and having a variation in cross-section in the flexible portion thereof, said variation and the connection of the inner end of the tube to the container cooperating so as to localize the folding of the tube at the point of variation in cross-section thereby effecting a sealing of the passage in the flexible portion when the outer end of the tube is forced inwardly relative to the container.

4. A fluid valve for containers comprising in combination, a tube having a flexible portion permitting a limited longitudinal movement of said tube, flexible connecting means intermediate the ends of said tube for connecting the tube to the container and for sealing the container, the inner end of said tube being anchored within the container and disposed so as to cause in the flexible portion of the tube below said flexible connecting means a fold which is shifted longitudinally of the flexible portion of the tube upon longitudinal movement of the tube, said tube having an opening inside of said flexible connecting means and a variation in cross-section between said opening and said flexible connecting means, the construction being such that, when the tube is longitudinally extended for inflating the container, the fold in the tube is located inwardly of said opening and when the tube is retracted, the fold occurs at the variation in cross-section and outwardly of the opening thereby sealing the tube and the container.

5. A fluid valve for containers comprising in combination, a tube flexibly sealed to the container and providing a passage therethrough for the movement of fluid, said tube having a flexible portion for permitting longitudinal movement thereof relative to the container, said tube having the inner end thereof connected to the container and disposed so as to effect a folding of the tube in said flexible portion, said tube having an opening through the flexible portion thereof and a variation in cross-section between said opening and the open end of the tube, said variation in cross-section and the connection of the inner end of the tube to the container cooperating to localize the folding of the tube at the point of variation in cross-section thereby effecting the sealing of the passage in the flexible portion when the outer end of the tube is forced inwardly relative to the container, said tube having a second variation in cross-section in the flexible portion thereof between said opening and the inner end of the tube, said second variation in cross-section cooperating with the connection of the inner end of the tube to the container to localize the folding of the tube at the said second point of variation when the tube is moved outwardly relative to the container whereby to maintain said opening in communication with the interior of the container.

6. A fluid valve for containers comprising in combination, a tube having a flexible portion permitting a limited longitudinal movement of said tube, flexible connecting means intermediate the ends of said tube for connecting the tube to the container and for sealing the container, the inner end of said tube being anchored within the container and disposed so as to cause in the flexible portion of the tube below said flexible connecting means a fold which is shifted longitudinally of the flexible portion of the tube upon longitudinal movement of the tube, said tube having an opening inside of said flexible connecting means and a variation in cross-section between said opening and said flexible connecting means, the construction being such that, when the tube is longitudinally extended for inflating the container, the fold in the tube is located inwardly of said opening and when the tube is retracted, the fold occurs at the variation in cross-section and outwardly of the opening thereby sealing the tube, a flexible air conduit communicating with the interior of the container and having the outer end thereof connected to said tube to facilitate the filling of the container with a liquid, said air conduit being movable with said tube and being sealed when said tube is retracted in its closed position.

HENRY JAMES BUTCHER.